March 2, 1943. H. ZIEBOLZ 2,312,464
STABILIZER SYSTEM FOR REGULATORS
Filed Aug. 3, 1940

Inventor
H. Ziebolz
By A. D. Adams
Attorney

Patented Mar. 2, 1943

2,312,464

UNITED STATES PATENT OFFICE 2,312,464

STABILIZER SYSTEM FOR REGULATORS

Herbert Ziebolz, Chicago, Ill., assignor to Askania Regulator Company, Chicago, Ill., a corporation of Illinois Application August 3, 1940, Serial No. 350,711

4 Claims. (Cl. 121—41)

This invention relates to stabilizer systems for regulators of the general type as disclosed in U. S. patent to Wünsch No. 1,959,889 and, among other objects, aims to provide an improved means for operating a hydraulic or fluid stabilizer in combination with a regulator by a variable orifice in one of the fluid lines to the operating or controlling cylinder. The invention aims to provide means responsive to a differential pressure across the variable orifice and means operated by the pressure differential responsive means to restore a relay mechanism to its neutral position.

Patent No. 1,959,889 shows a standard "Askania" hydraulic stabilizer in which the main principle resides in measuring the stroke of the controlling piston by means of a positive displacement motor (shown as a piston in a cylinder), which is inserted into one of the oil lines leading to the control cylinder. This is also shown in U. S. Patent No. 2,172,315. Therefore, the stroke of the motor is directly proportional to that of the controlling piston and is a measure of the stroke of the piston. An improvement of this system is disclosed in U. S. Patent No. 2,227,170. Further in some cases where greater speed of control is desired, a pilot valve may be used in combination with the jet pipe and, in this system the oil circuit to operate the hydraulic stabilizer remains the same. In general, the invention of the present application resides in applying a differential pressure to a piston to obtain a movement of a spring in response to the differential pressure across a restriction of one of the oil lines leading to the control piston.

More particularly, the invention therefore resides in providing a variable orifice in the system the size of which varies with different piston speeds, this orifice being practically closed for the neutral position when the piston speed is zero. This is accomplished by adjusting a variable restriction proportionally to the displacement of a pilot valve.

With the foregoing and other objects in view, the invention will be best understood by reference to the description, when considered in connection with the accompanying drawing, wherein.

Figures 1, 2:
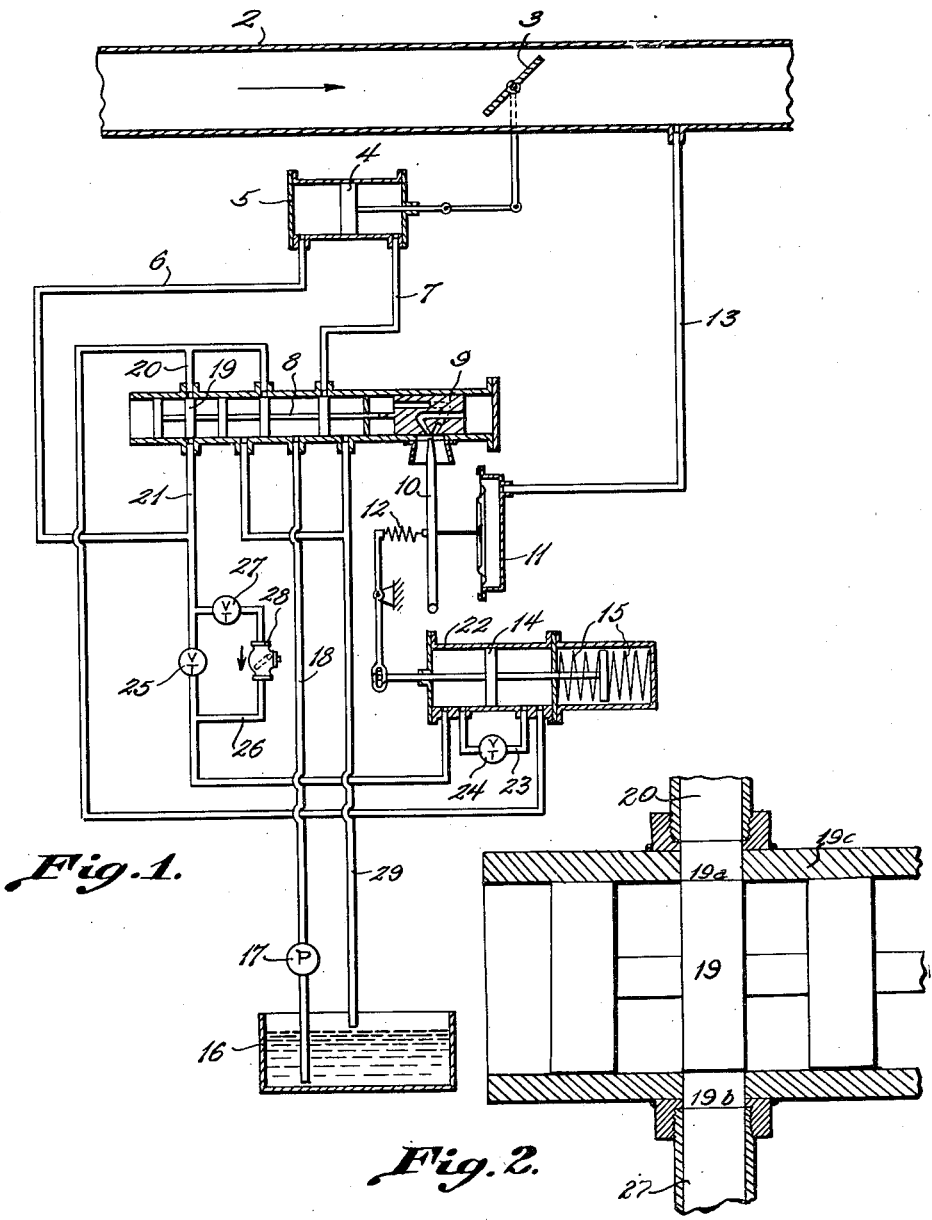
Fig. 1 shows one illustrative embodiment as a diagrammatic view.
Fig. 2 is a sectional view of a detail on an enlarged scale.

The conduit 2 has a fluid flowing therein in the direction of the arrow and the flow of the fluid is controlled by a valve or control member 3. The position of the valve 3 is controlled by a piston 4 in the cylinder 5 and this cylinder is in communication with a hydraulic fluid by means of conduits 6 and 7, one leading to each end of the cylinder.

A pilot valve 8 is controlled by a receiving piston 9 of a jet pipe relay 10 which latter forces oil under pressure into one side of the piston 9 depending upon the position of the jet pipe, as is well known. The jet pipe is controlled by a diaphragm casing 11 on one side and spring 12 on the other side. The diaphragm casing 11 is under the influence of the pressure in the conduit 2 by means of conduit 13 and the tension in the spring 12 is varied by a piston 14 which is normally held in its intermediate position by springs 15.

A pressure fluid, such as oil, is supplied for instance from a tank 16 by pump 17 to the pilot valve 8 by means of conduit 18 the return conduit being indicated at 29. A variable orifice piston valve 19 is secured to and moves with the pilot valve 8 and this valve 19 controls the flow of oil in conduits 20 and 21, which also lead to the cylinder 22 of the piston 14, the cylinder 22 being interconnected by a by-pass 23 having a manually operable valve 24 therein. Also the conduit 21 has a manually operable needle valve 25 with a by-pass conduit 26 also provided with a manually operable needle valve 27 and a check valve 28.

Fig. 2 shows the variable orifice valve 19 as a valve which includes the casing 19c, the ports 19a and 19b and the piston 19.

As the variable orifice piston valve 19 changes in size, relative to the port openings 19a and 19b to the conduits 20 and 21, with movement of the pilot valve 8 and the oil flow through the orifice valve 19 is from conduit 20 to conduit 21 with the piston 4 at rest, the movement of the piston 14 is entirely under the control of the by-pass 23 and needle valve 25 thus controls the speed of the piston 14 in relation to the piston 4. The check valve 28 around the needle valve 25 and the needle valve 27 in the by-pass 26 permits an adjustment of a different rate of re-adjustment of the spring 12 for the same speed of the piston 4 for a different direction of the movement of the piston 4. This is a desirable adjustment if, for instance, a difference of time lag has to be compensated for.

In case of room temperature controls, for instance, there is a difference in the rate of temperature change for an increase in temperature and a decrease in temperature, in many cases depending on the type of the radiators used as well as on the circulation of air in the room.

It is therefore necessary or desirable to compensate more for a decrease in temperature than for an increase in temperature. Likewise, on hydraulic couplings of fans there is usually a great difference in the rate of acceleration or deceleration, and in accordance with this invention it is possible to compensate for this variation by adjusting different rates of compensation. It is therefore desirable to have less stabilization for increase in load than for decrease in load. Previously, it was necessary to compromise and to consider the most unfavorable condition.

The operation of the system is as follows:

If the pressure in conduit 13 increases the diaphragm 11' turns the jet pipe 10 counterclockwise against the action of spring 12. The oil thus momentarily creates a differential pressure on opposite sides of the piston 9 as these sides are crosswise connected with the two adjacent receiving nozzles opposite to the jet pipe nozzle 10. If for instance, the jet pipe moves to the left, as assumed, the pressure in the left hand receiving nozzle increases and thus the pressure on the right hand side of piston 9 increases. This forces the piston 9 to the left until the two orifices are again directly opposite the jet nozzle 10 and both pressures substantially the same in both receiving nozzles. Thus piston 9 follows all movements of the jet pipe nozzle as if mechanically connected therewith. Connected with this piston 9 is a four-way valve 8 and directly attached to this valve 8 is the variable orifice valve 19. Oil is supplied to the pilot valve 8 by means of the pump 17 through conduit 18 and through the pipe 7 and the pipe 20 with pipe 6 to either side of the double acting piston 4. The pilot valve 8 is of conventional design, the oil returning through the pipe 29 back to the tank 16.

As the amount of oil going to or coming from the cylinder 5 is a measure of the amount of the valve travel 3, the rate of oil flow is measured by the restriction 19 which is inserted between the pipes 20 and 21.

Assuming now that element 19 is a fixed restriction and not as shown connected to pilot valve 8, then the pressure drop across this restriction will vary with the rate of flow (2nd power relation) and this pressure drop can be used to operate a device which will counteract the increased pressure from the diaphragm 11' and thus restore the jet pipe 10 back to its neutral position.

Two differential pressure measuring connections therefore branch off ahead and behind the restriction 19, i. e. from the conduits 20 and 21 and apply the created pressure differential to the piston 14 held by the two springs 15 in its center position. As the piston starts to travel to the left, due to the higher pressure in the pipe 20, it compresses the spring 12 and restores the jet pipe 10 and thus the four way valve 8 into the neutral position. Pitson 4 thus comes to rest and the pressure has time to readjust itself in the pipe 13. To bring the setting of spring 12 slowly back to normal, a bypass between the valve 24 and the pipe 23 is provided which permits the springs 15 to return the piston 14 to its neutral position.

Piston 14 can be considered as an integrator of the fluid rate impulse transmitted from the pipes 20 and 21 and thus it becomes apparent that piston 14 will move proportionally to the piston 4.

Thus far, it has been assumed that element 19 is a fixed restriction, that is an orifice in the connection between the pipes 20 and 21. Such a restriction would show the disadvantage that it is very effective at great rates of flow and very little responsive to small rates of flow (2nd power actuation). Furthermore, a fixed opening between the pipes 20 and 21 would open a bypass between the valve 24 and pipe 23 and thus the throttle valve in the bypass could not any longer determine the rate at which the piston 14 and thus spring 12 is restored to its center position.

According to the invention, the variable restriction 19 is mechanically connected to the pilot valve 8 and may consist of the cylindrical piston 19 which with no overlapping closes the ports in the pipes 20 and 21 in its middle position. With the pilot valve 8 in its neutral position the ports to the pipes 20 and 21 are closed, the pressures on both sides of the piston 14 are equalized and springs 15 return the piston 14 into its center position at a rate which depends mainly on the throttling effect of the valve 24.

A small deflection of the jet 10 and thus of the pilot valve 8 will also only slightly change the positions of the restriction 19 and thus offer a great resistance in flow to the oil which moves piston 4. Thus in spite of a relatively slow movement of the piston 4 a sufficiently high differential is built up to move piston 14. Proper design of the ports to pipes 20 and 21 and the piston 19 permit variations of differential pressure versus cylinder speed.

The rate of travel of the piston 14 and thus its total stroke for a given time depends not only on the differential pressure but also on its volume and the resistance of the oil lines leading from the restriction 19 to both of its sides. The needle valve 25 which is effective in both directions of the piston travel as the same amount of oil has to pass through it for the movement of the piston 14 in either direction, permits an adjustment of the proportionality factor between the travel of the pistons 4 and 14 and thus of the amount of reset (stabilization).

There are conditions where different amounts of stabilization are desirable depending on the controlled conditions. If, for instance, a fan works against a pressure, any mass inertia in speeding up is relatively dampened by the increase in load. On the other hand, if a fan load is being decreased, the decrease in resistance increases the time which passes until a new stable speed is obtained. Such a fan control should have a greater amount of reset for decrease in load as compared with increase in load. This is accomplished by means of the branch 28, 26 and 27 which comprises the throttle valve 27 and the check valve 28. In one direction the check valve 28 is open and oil can go through valves 25 and 27 but in the other direction only through the valve 25 because the check valve 28 is closed. Thus, different rates of resetting of the spring 12 are obtained for the same travel of the piston 4 depending on its directions of travel.

It is obvious that the invention makes it possible to use the same size of the piston 14 for various sizes and strokes of the piston 4.

Obviously, the present invention is not restricted to the particular embodiment herein shown and described. Moreover, it is not indispensable that all the features of this invention be used conjointly, since they may be employed advantageously in various combinations and subcombinations.

What is claimed is:

1. In a regulator of the hydraulic fluid type, an impulse system comprising a pilot valve responding to condition changes, a piston controlling the condition, a source of fluid to be controlled to operate said piston including a pair of conduits, a variable orifice in one of the conduits connecting the fluid source and pilot value to the piston, means for varying the size of the orifice proportionally to the pilot valve travel or displacement, means responsive to the pressure drop across the variable orifice, means for resetting the system in accordance with the movement of the pressure differential responsive means, restoring means to return the pressure differential responsive means into its neutral position, means to vary the rate of the restoring action, and means to vary the rate of travel of the differential pressure responsive means.

2. In a regulator of the hydraulic fluid type, an impulse system comprising a pilot valve responding to condition changes, a piston controlling the condition, a source of fluid to be controlled to operate said piston including a pair of conduits, a variable orifice in one of the conduits connecting the fluid source and pilot valve to the piston, means for varying the size of the orifice proportionally to the pilot valve travel or displacement, means responsive to the pressure drop across the variable orifice, means for resetting the system in accordance with the movement of the pressure differential responsive means; and restoring means to return the pressure differential responsive means into its neutral position.

3. In a regulator of the hydraulic fluid type, an impulse system comprising a pilot valve responding to condition changes, a piston controlling the condition, a source of fluid to be controlled to operate said piston including a pair of conduits, a variable orifice in one of the conduits connecting the fluid source and pilot valve to the piston, means for varying the size of the orifice proportionally to the pilot valve travel or displacement, means responsive to the pressure drop across the variable orifice, means for resetting the system in accordance with the movement of the pressure differential responsive means, restoring means to return the pressure differential responsive means into its neutral position, means to vary the rate of the restoring action, and means to vary the rate of travel of the differential pressure responsive means.

4. In a regulator of the hydraulic fluid type, an impulse system comprising a pilot valve responding to condition changes, a piston controlling the condition, a source of fluid to be controlled to operate said piston including a pair of conduits, a variable orifice in one of the conduits connecting the fluid source and pilot valve to the piston, means for varying the size of the orifice proportionally to the pilot valve travel or displacement, means responsive to the pressure drop across the variable orifice, means for resetting the system in accordance with the movement of the pressure differential responsive means, and variable means to return the pressure differential responsive means into its neutral position and to vary the rate of the restoring action.

HERBERT ZIEBOLZ.